No. 793,214. PATENTED JUNE 27, 1905.
F. NEUHAUS.
SPRING WEIGHTED PLATE VALVE FOR PUMPING ENGINES, COMPRESSORS, AIR PUMPS, OR THE LIKE.
APPLICATION FILED APR. 21, 1904.
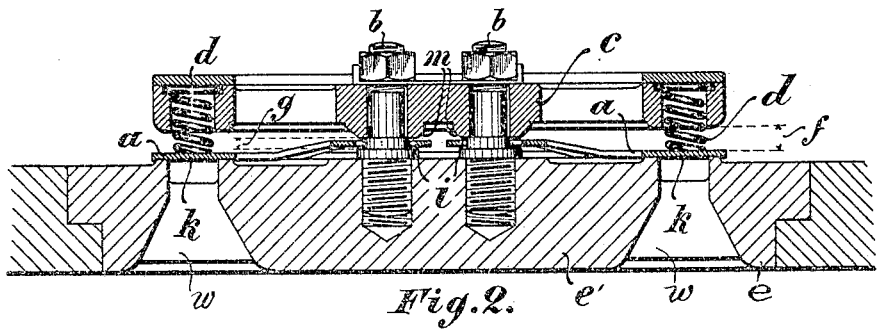
Fig. 1.
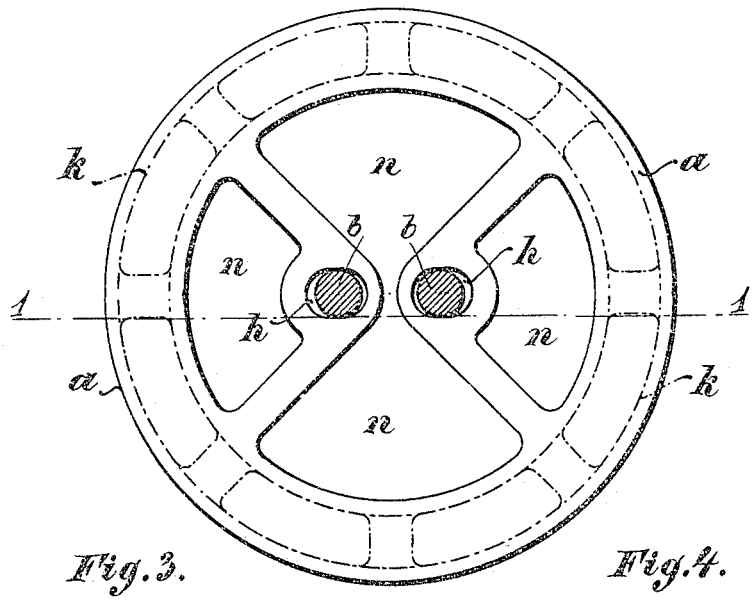
Fig. 2.
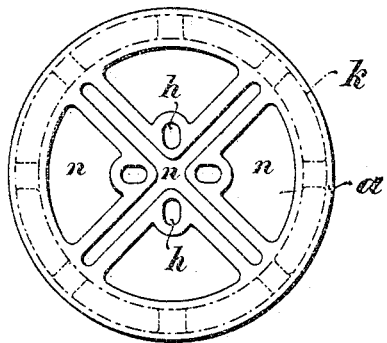
Fig. 3.
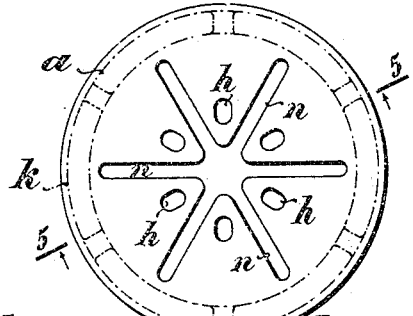
Fig. 4.
Fig. 5.
Witnesses,
Frank O'Connor
N. H. Humphrey
Inventor,
Fritz Neuhaus,
by
H. Parkersmith
Attorney.

No. 793,214.

Patented June 27, 1905.

UNITED STATES PATENT OFFICE.

FRITZ NEUHAUS, OF CHARLOTTENBURG, GERMANY.

SPRING-WEIGHTED PLATE-VALVE FOR PUMPING-ENGINES, COMPRESSORS, AIR-PUMPS, OR THE LIKE.

SPECIFICATION forming part of Letters Patent No. 793,214, dated June 27, 1905.

Application filed April 21, 1904. Serial No. 204,278.

*To all whom it may concern:*

Be it known that I, FRITZ NEUHAUS, a subject of the King of Prussia, German Emperor, whose post-office address is No. 31 Schlüterstrasse, Charlottenburg, near Berlin, Prussia, German Empire, have invented a new and useful Improvement in Spring-Weighted Plate-Valves for Pumping-Engines, Compressors, Air-Pumps, or the Like, of which the following is a specification.

Valves for pumps and the like consisting of a sheet-metal disk or plate guided either by resilient arms or by cylindrical bolts or by springs are known. They have almost all the advantages of great simplicity over other valve systems; but they are very fragile. When the machine is run at a high speed or if the valve is constructed to perform a somewhat long stroke, the arms and springs are liable to break and the guiding-surfaces will soon wear out.

My present invention consists in a sheet-metal valve which, while quite as simple in construction as those that are known and also adapted for being used in pumping-engines, compressors, air-pumps, and the like, has the advantage of being less exposed to fracture and wear.

The preferred form of apparatus embodying my invention and several modifications thereof is represented on the annexed drawings, in which—

Figure 1 is a section on line 1 1 of Fig. 2. Fig. 2 is a plan view of the valve-plate, bolts $b\ b$ being shown in cross-section. Figs. 3 and 4 show modified forms of sheet-metal valve-plates in plan view, and Fig. 5 is a cross-section on line 5 5 of Fig. 4.

The closing member of my improved valve is formed by a thin sheet-metal plate $a$, guided and limited in its vertical movements between the valve-seat $e$ and the stop-plate $c$ by the bolts or studs $b$ in such a manner that the portion of the valve-plate near the guiding bolts or studs does not on operation of the valve partake of the total stroke of the closing faces $k$ of the valve-plate, but only of a part of the same. To that end the bolts or studs are provided with collars, such as $i$, or the valve-seat or the stop-plate with projecting abutments, such as $m$, or both these constructions are employed so that on operation of the valve the displacement of the portion of the same near such bolts is less than the displacement of the portion constituting the closing face.

The opening in the valve-seat is annular, the central portion $e'$ of said seat being supported by a series of radial wings $w$, as shown in Fig. 1. The outer rim of the plate $a$ overlaps and closes this annular opening. The plate $a$ is cut away toward its central portion, as at $n\ n$, (see Figs. 2, 3, and 4,) to give greater flexibility thereto and larger valve-opening, or this central portion is made of reduced thickness, as shown in Fig. 5, these being equivalent methods of reducing the body of the valve-plate to give flexibility at the point of support on the guides.

As is shown in Fig. 1, the closing face $k$ of the valve-plate has the total stroke $f$, whereas the portions of the valve-plate near the guiding-bolts have only the total stroke $g$, whereby the friction is very much reduced, the difference being compensated for by the flexibility of the valve-plate. By providing openings $n$ in the plates, as shown in Figs. 2, 3, and 4, or by reducing the thickness of the same in the direction of the guiding-holes $h$, as shown in Fig. 5, the deflection required for operating the valve will take place only at these parts which do not serve as a closing face, so that the closing face proper is not subjected to any change in form. The stop-plate $c$ limits the amount of stroke of the operating-face of the valve-plate, and the springs $d\ d$ insure the smooth opening of the valve. To allow the plate to move freely on the guiding bolts or studs, the guiding-holes are made oval, or at least with considerable play. To reduce the deflections of the plate as much as possible, this is so disposed in the valve that in the condition of rest it is located about midway between the stop-plate and the valve-seat. Springs $d$ do not strike their overhead seats until the plate $a$ has been raised thus far. The deflections of the plate $a$ will therefore take place both upward and downward, and the total amount of deflection is only half of what it would be if in the position of rest the valve-plate were resting on the seat. As shown in Fig. 1, the plate has been deflected downward by pressure of the fluid to close the valve.

Having therefore described my invention, what I claim as new, and desire to protect by Letters Patent, is—

1. The combination of a valve-seat, a flexible sheet-metal valve-plate and a stop-plate for the same, the normal position of rest of the valve-plate being midway between the seat and the stop-plate together with supporting means for said valve-plate.

2. The combination of a valve-seat, a flexible sheet-metal valve-plate and a stop-plate for the same, the normal position of rest of the valve-plate being midway between the seat and the stop-plate, together with guiding means for the valve-plate upon which the same is loosely mounted.

3. The combination of a valve-seat, a flexible sheet-metal valve-plate and a stop-plate for the same, the normal position of rest of the valve-plate being midway between the seat and the stop-plate, together with guiding means for the valve-plate upon which the same is loosely mounted and on which its motion toward and from the valve-seat is limited to a fraction of the valve-lift.

In testimony whereof I have hereunto set my hand in presence of two subscribing witnesses.

FRITZ NEUHAUS.

Witnesses:
 WOLDEMAR HAUPT,
 HENRY HASPER.